April 7, 1925.

P. S. SHIELD

MOVABLE TRANSMISSION UNIT

Filed May 26, 1923

INVENTOR
Paul S. Shield
BY
J. F. Brandenburg
ATTORNEY

April 7, 1925.
P. S. SHIELD
MOVABLE TRANSMISSION UNIT
Filed May 26, 1923 4 Sheets-Sheet 4
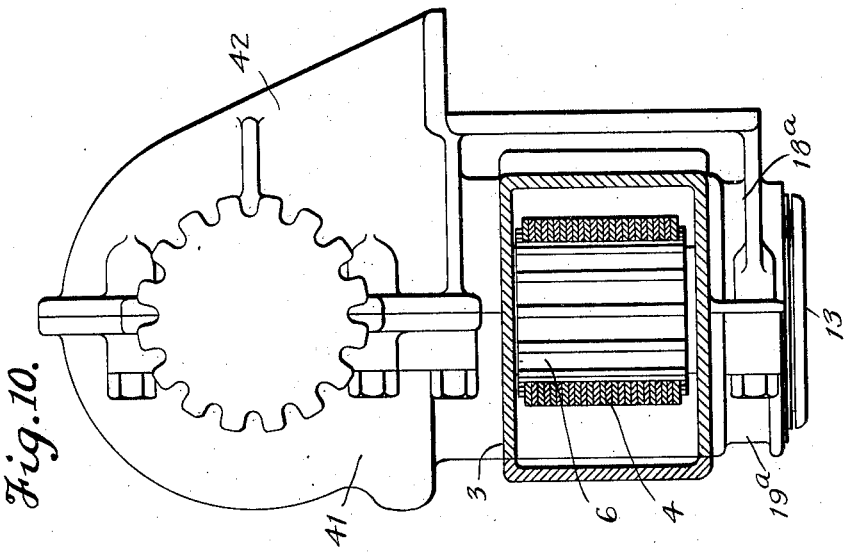
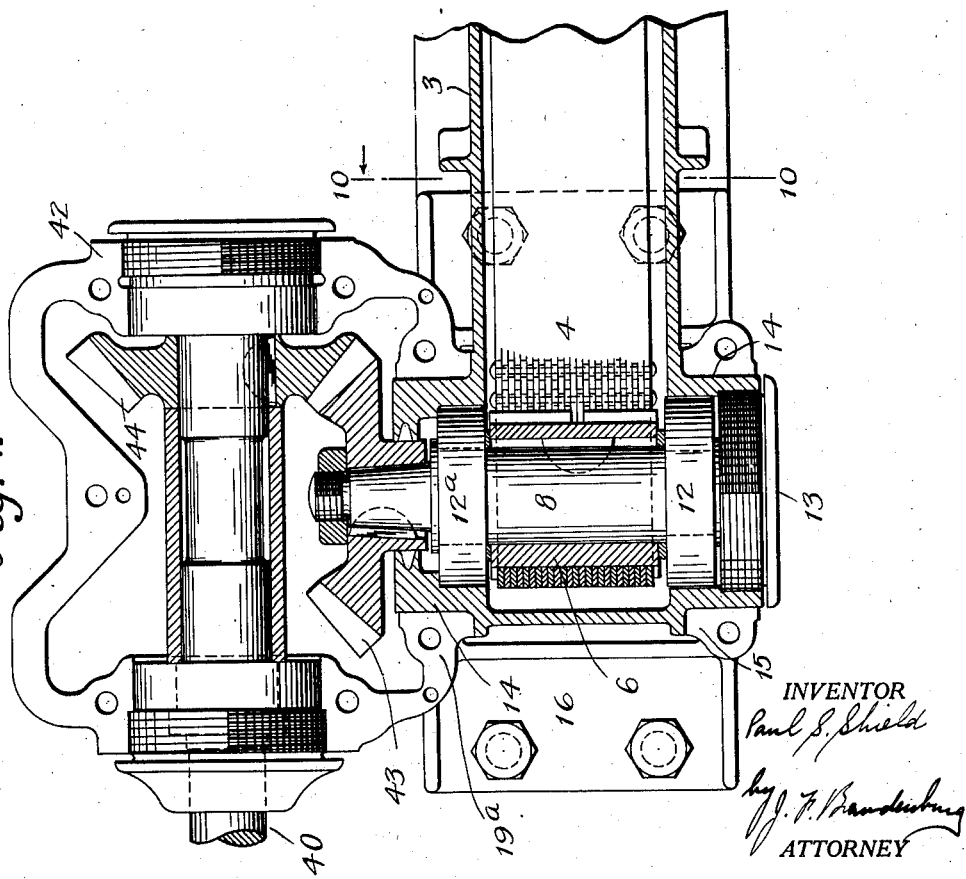
INVENTOR
Paul S. Shield
J. F. Brandenburg
ATTORNEY Patented Apr. 7, 1925.

1,532,270

UNITED STATES PATENT OFFICE.

PAUL S. SHIELD, OF CINCINNATI, OHIO, ASSIGNOR TO AUGUSTINE DAVIS, JR., OF COVINGTON, KENTUCKY.

MOVABLE TRANSMISSION UNIT.

Application filed May 26, 1923. Serial No. 641,585.

*To all whom it may concern:*

Be it known that I, PAUL S. SHIELD, a citizen of the United States, and a resident of Cincinnati, in the county of Hamilton and State of Ohio, have invented a new and useful Movable Transmission Unit, of which the following is a specification.

The subject of the invention is a simple and effective power-transmission unit or drive adapted for universal adjustment, as on the chassis of a motor truck, between the source of power, specifically a sprocket chain rising from a power take-off in the truck transmission, and a piece of driven equipment, such as a pump carried by the vehicle. Such power take-offs are differently positioned in the various makes of trucks, and depending upon requirements the pump or the like to be operated may be at different points at the end or side of the vehicle. It is an object of the invention to provide for all such conditions, at the same time keeping the internal and external drive chains always properly adjusted throughout their normal life.

In the accompanying drawings forming a part hereof:

Fig. 9 is a sectional plan taken at the power-delivery end of the unit seen in Figs. 7 and 8; and Fig. 10 is a sectional elevation taken on the line 9—9 of Fig. 9.

Figure 1:
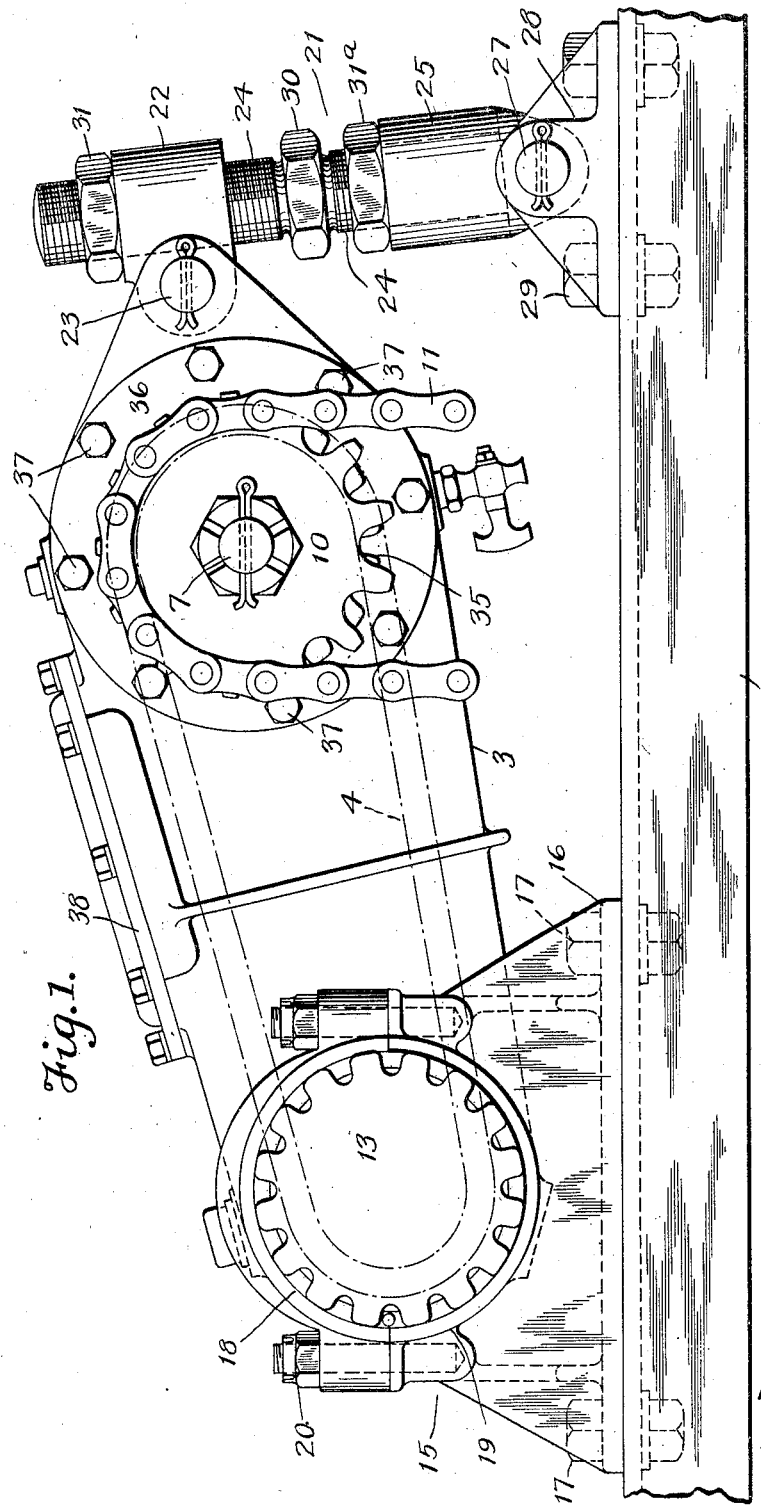
Fig. 1 is a front elevation of the drive mounted on a supporting member.

The unit is mounted on a transverse member 2 extending across between the side members of the frame of a motor truck.

A chain-case 3, disposed lengthwise above the member 2, contains a silent chain-belt 4, passing over sprockets 5, 6, on shafts 7, 8. The shaft 7 will be termed the power-receiving shaft and the shaft 8 the power-delivering shaft. One end of the power-delivering shaft projects from the chain-case, and, in Figs. 1 to 5, is connected by a universal joint 9 with a shaft, not shown, which runs to the rear end of the vehicle, or other point, to drive the pump or the like. One end of the power-receiving shaft 7 likewise projects and carries an external sprocket 10, which receives a chain 11 that extends upward from a power take-off sprocket in the vehicle transmission (not shown).

The power-delivery shaft 8 is journaled in ball-bearings 12, 12ª in recesses in opposite sides of one end of the chain-case, the recess opposite the outwardly extending end of this shaft opening through the wall of the case and being closed by a ball-bearing retainer cover 13. This end of the case is formed at opposite sides with trunnion bosses 14, coaxial with the shaft; and these bosses are rotatable in a trunnion-bearing 15. The coaxial relation between the shaft 8 and the trunnion-bearing permits the chain-case to pivot in the trunnion-bearing without any lateral displacement of the shaft and its universal joint 9.

The trunnion-bearing 15 has suitable base 16 secured by bolts 17 to the supporting member 2, and is made in two parts, separating at the horizontal diametrical plane, the cap part 18 being fastened to the lower or body part 19 by stud-bolts and nuts 20.

Figure 2:
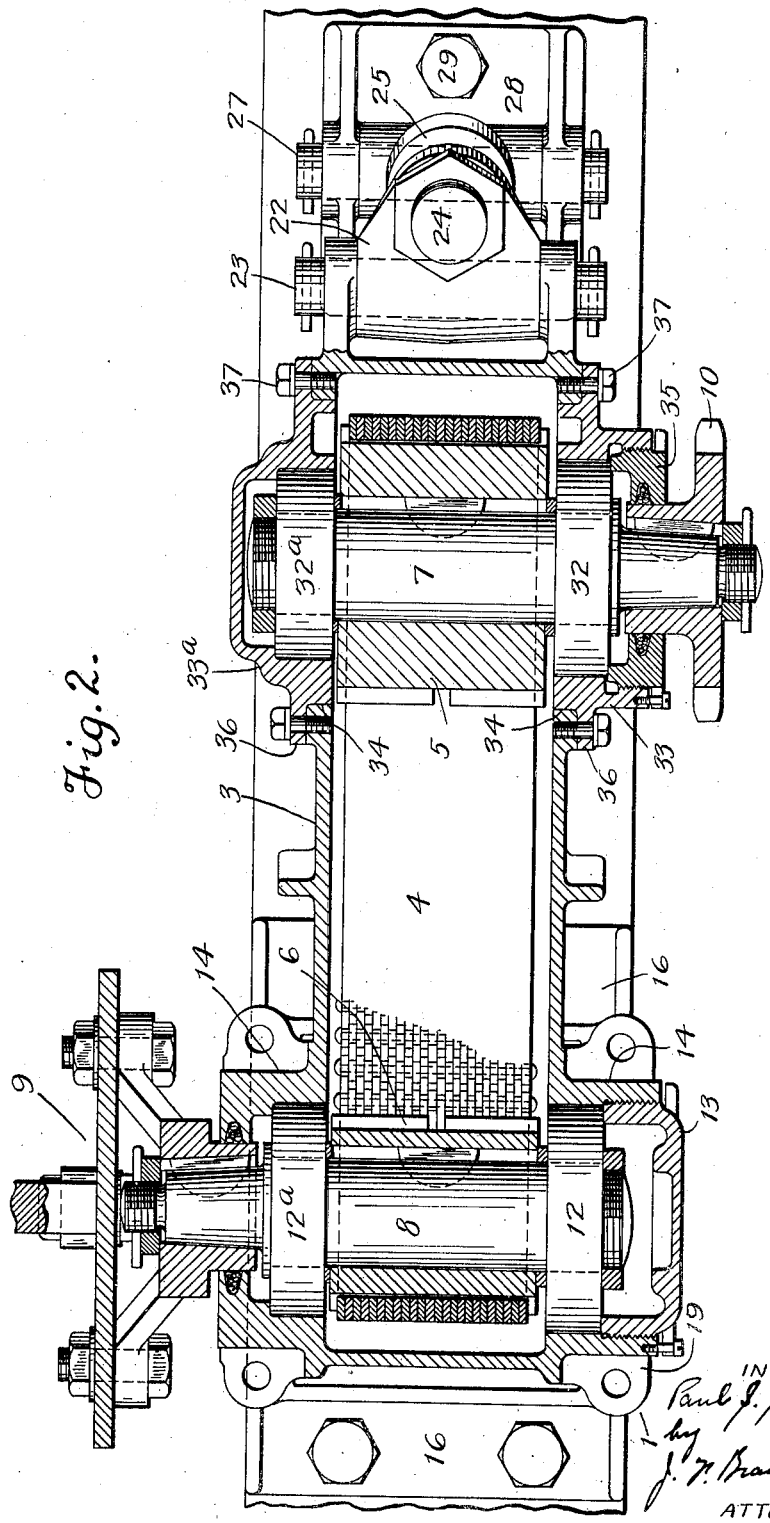
Fig. 2 is a sectional plan.
Figure 3:
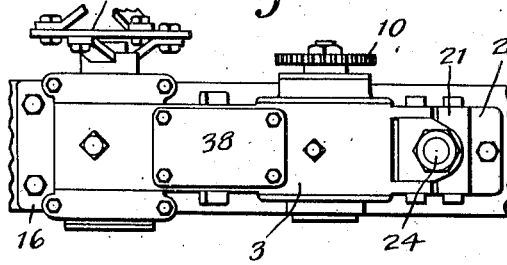
Figs. 3, 4 and 5 are small-scale plan views
Figure 4:
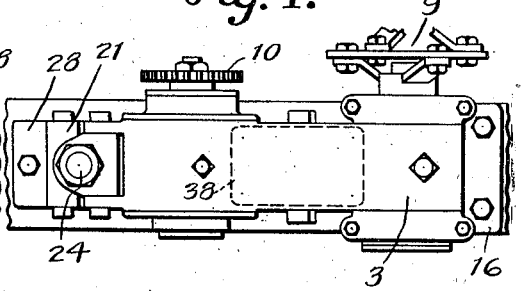
Figure 5:
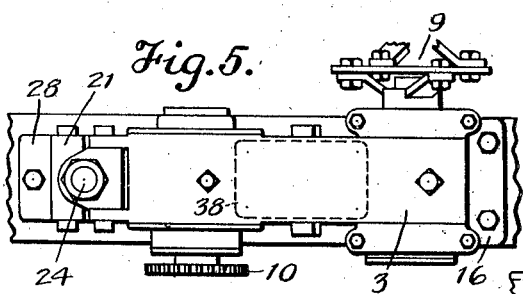
Figure 6:
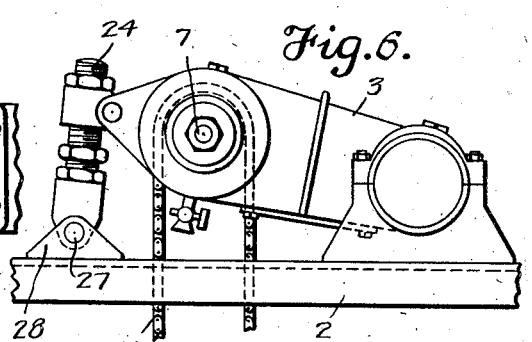
Fig. 6 is a small-scale elevation, showing different positions of the drive.

The chain-case can be swung all the way over on the trunnion-bearing, from the right-hand-extending position of Figs. 1, 2 and 3 to the left-hand-extending position of Figs. 4, 5 and 6.

The opposite end of the chain-case is supported at variable vertical adjustment by a screw device 21. For this purpose, in the preferred construction, a member 22, internally threaded like a nut, is pivoted by a transverse pin 23 to the end of the case, and a right- and left-hand threaded screw 24 has one portion threaded into this member and its other portion threaded into another nut member 25. The latter nut member is pivoted by a transverse pin 27 to an adjusting-screw bearing 28, which is fastened to the support 2 by bolts 29.

The screw proper has a central hexagon enlargement 30 for operation by a wrench, and lock nuts 31, 31ª applied to its reversely threaded portions to bear against the pivoted nut members render the adjustment secure. The device thus constituted forms a variable length strut, and, by loosening the lock-nuts and turning the screw from time to time, wear in the driving chain 11 can readily be taken up, thereby eliminating trouble incident to removal of links from the chain to compensate for wear in the ordinary way, and also doing away with the noisy operation of the chain during the time it is attaining sufficient wear to permit the removal of a link, besides eliminating the detrimental action on the mechanism of a very loose chain.

The power-receiving shaft 7 has ball-bearings 32, 32$^a$ in recesses in closure and bearing plates 33, 33$^a$ at opposite sides of the chain-case. These plates are movable and removable, and also interchangeable, one for the other, having cylindrical rim journals 34, of equal diameter, which fit into circular seat openings in the casing side walls. The plate 33$^a$ is closed, and shouldered to receive the thrust of the bearing 32$^a$, while the plate 33 is open and is internally threaded for a ball-bearing retainer 35. Both plates have radially projecting flanges 36, which are perforated at equal intervals for the passage of two circular series of screws 37. The latter screw into corresponding, threaded holes in the thickened annular portions of the casing walls bordering the seat openings. The journals 34 of the plates are eccentric to the shaft bearings and shaft, and the screw holes in the opposite walls correspond directly with each other, so that by taking out the screws and turning the plates the distance of one or more holes, and then replacing the screws, the distance between the shafts 7 and 8 can be varied, while keeping the shaft 7 and its bearings always in proper line. In this way, the chain 4 is kept at a proper tension for correct operation.

The shaft 7, with its external sprocket 10, and the plates 33, 33$^a$ and bearings 32, 32$^a$ are also reversible end for end, the plates being interchangeable as previously stated. At the opposite end of the case, the trunnions 14 of the case itself are also reversible, end for end, in the trunnion bearing 15, it being necessary for this purpose merely to remove the cap 18 of the trunnion-bearing, turn the case upside down, and replace the cap.

By these provisions the receiving end 10 of the drive unit can be positioned at either front or back, likewise the delivering end 9, and the two ends can be at the same side, at either side, or at opposite sides, in either combination, as desired.

Furthermore, as hereinbefore stated, the adjusting-screw bearing 28 can be unbolted from the support and the chain case turned all the way over, so that it extends to the left instead of the right of the trunnion-bearing 15. This will necessitate reversing the adjusting strut screw 24 in the nut member 22, before the bearing 28 is fastened to its new position on the support, and presumably the trunnion-bearing 15 will also be unbolted from the support and somewhat shifted. Bolt-holes can be provided at appropriate intervals in the member 2, or can be bored as required.

By these divers flexibilities, in an otherwise integral unit, the numerous variations in environment on trucks and in relation between the power take-off and the apparatus to be driven, can be easily taken care of.

The chain-case 3 has a cover-plate 38, fastened over a corresponding opening by bolts 39. This permits of easy introduction of the silent chain 4 and the linking up of its free ends, besides convenient access for manipulation of the chain while introducing the sprockets 5, 6. It also affords a ready means for inspection of the chain from time to time. When the chain-case is turned about its longitudinal axis, or swung on the trunnion-bearing, so as to turn it upside down, this plate will be at the bottom instead of the top, and it might be duplicated above and below, but, practically, this is not necessary. It may be noted that the case is provided at its ends, both above and below, with tap-holes, serving for filling, draining, and oil-level cock, for all the positions in which it may be desired to place the case.

Figs. 3, 4, 5, and 6 show variations in adaptability of the drive. In Fig. 3, the external driving sprocket chain 11, from the power take-off, is brought up at the back instead of the front of the supporting member 2, the power-receiving and delivering ends, thus, being at the same side. In Fig. 4, they are at the same side,—the rear,—but the whole case has been swung over, so that the power-delivering end is at the right instead of at the left of the power-receiving end. Fig. 5 corresponds to Fig. 4. In Fig. 6 the power-delivering end is at the right of the power-receiving end, as in Fig. 4, but the power-receiving end is at the front and the power-delivering end is at the back. Manifestly, the power-receiving end could be at the back, and the power-delivering end could be at the front in any of these combinations, if desired.

Figs. 7 to 10 show a form in which it is desirable to be able to place the power-delivering end of the unit transmission at either the front or the back, irrespective of the position of the power-receiving end. In this construction the delivery end is continued by a shaft 40, which runs out laterally to one side of the vehicle, where it may be required to place the pump or other piece of apparatus, the shaft, that is to say, lying parallel with the longitudinal axis of the chain-base 3.

This form involves a substitution for the cap and body parts 18, 19 of the trunnion-bearing hereinbefore described, of corresponding parts 18ª, 19ª, having formed integral therewith, at one side, the upper and lower halves 41, 42 of a bevel-gear case, the whole splitting horizontally and being united by suitable screws. The projecting end of the power-delivering shaft 8 carries in this instance a bevel-gear 43, which meshes with a bevel-gear 44, which is on the lateral shaft 40, journaled in suitable bearings and extending outward to the point of utilization of the power.

Figure 7:
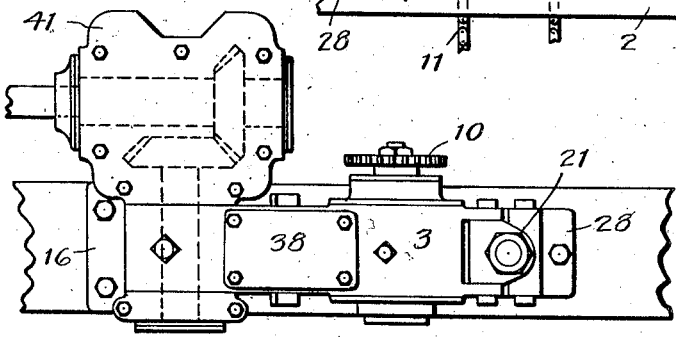
Figs. 7 and 8 are plan views showing two positions of a modified form.
Figure 8:
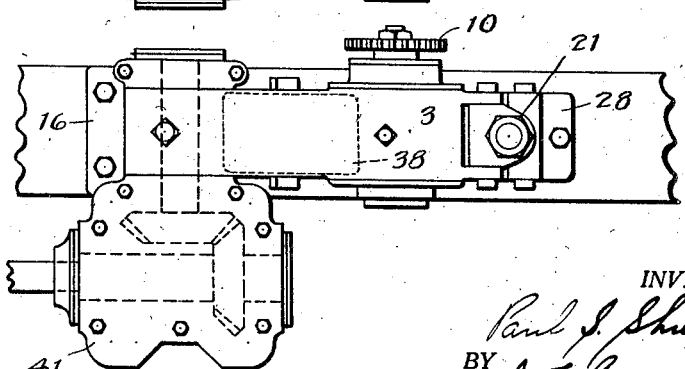

To effect the change from the position of Fig. 7 to that of Fig. 8, the cap part of the trunnion-bearing is removed, and the chain-case is turned upside down about its longitudinal axis, the adjusting screw being also reversed relative to the case. Also, the trunnion-bearing with the bevel gear case is unbolted from member 2 and turned around horizontally through 180°, and the two end closures of the bevel gear case are interchanged to permit the shaft to project as shown. In order to keep the power-receiving end at the same side as before, the bearing and closure plates are removed from the case, and the power-receiving shaft is reversed. Numerous other changes of position can be made.

What I claim as new is:

1. In a transmission unit, a trunnion-bearing, a chain-case pivotally supported at said trunnion-bearing, a chain in the chain-case, a power-delivering shaft and sprocket for said chain in the trunnion end of the chain-case and coaxial with the trunnion-bearing, a power-receiving shaft and sprocket for the chain in the remote end of the chain-case, a sprocket on the outer part of the latter shaft, a driving chain on said sprocket, a screw device cooperative with the chain-case to support the same in adjustable angular relation to the trunnion-bearing in order to adjust the said driving chain.

2. In a transmission unit, a trunnion-bearing, a chain-case pivotally supported at said trunnion-bearing, a chain in the chain-case, a power-delivering shaft and sprocket for said chain in the trunnion end of the chain-case, a power-receiving shaft and sprocket for the chain in the remote end of the chain-case, a sprocket on the outer part of the latter shaft to receive a driving chain, means permitting reversal end for end of said power-receiving shaft in the chain-case, and an adjusting screw device cooperative with the chain-case.

3. In a transmission unit, a support, a trunnion-bearing thereon, a chain-case pivotally supported at said trunnion-bearing, a chain in the chain case, a power-delivering shaft and sprocket for said chain in the trunnion end of the chain-case, a power-receiving shaft and sprocket for the chain in the remote end of the chain case, a sprocket on the outer part of the latter shaft to receive a driving chain, an adjusting-screw bearing on the support, an adjusting-screw connecting said remote end of the chain-case with said adjusting-screw bearing, said trunnion-bearing and adjusting-screw bearing being reversible on the support in respect to their right- and left-hand relation to each other, and the chain-case being adapted to be swung in the trunnion-bearing to reverse it end for end, the adjusting screw being likewise reversible on its end of the chain-case.

4. In a transmission unit, a trunnion-bearing, a chain-case pivotally supported at said trunnion-bearing, a chain in the chain-case, a power-delivering shaft and sprocket for said chain in the trunnion end of the chain-case and coaxial with the trunnion-bearing, a power receiving shaft and sprocket for the chain in the remote end of the chain-case, a sprocket on the outer part of the latter shaft, a driving chain on said sprocket, bearings for said power-receiving shaft eccentrically seated in the chain-case so as to be capable of being turned and held in desired position to adjust the chain inside, and an adjusting screw device cooperative with the chain-case to adjust the said driving chain.

5. In a transmission unit, a trunnion-bearing, a chain-case pivotally supported at said trunnion-bearing, a chain in the chain-case, a power-delivering shaft and sprocket for said chain in the trunnion end of the chain-case, a power-receiving shaft and sprocket for the chain in the remote end of the chain-case, a sprocket on the outer part of the latter shaft to receive a driving chain, removable and interchangeable bearing and closure plates at the power-receiving end of the chain-case, and an adjusting screw device cooperative with the chain-case.

6. In a transmission unit, a trunnion-bearing, a chain-case pivotally supported at said trunnion-bearing, a chain in the chain-case, a power-delivering shaft and sprocket for said chain in the trunnion end of the chain-case, a power-receiving shaft and sprocket for the chain in the remote end of the chain-case, a sprocket on the outer part of the latter shaft to receive a driving chain, removable and interchangeable bearing and closure plates at the power-receiving end of the chain-case, said plates being turnable in duplicate eccentric seats at opposite sides of the chain-case, and an adjusting screw device cooperative with the chain-case.

7. In a transmission unit, a trunnion-bearing, a chain-case pivotally supported at said trunnion-bearing, a chain in the chain-case, a power-delivering shaft and sprocket for said chain in the trunnion end of the chain-case, a power-receiving shaft and sprocket for the chain in the remote end of the chain-case, a sprocket on the outer part of the latter shaft to receive a driving chain, said power-receiving shaft being reversible end for end in the chain-case, and the trunnion end of the chain-case being likewise reversible in the trunnion-bearing, and an adjusting screw device cooperative with the chain-case.

8. In a transmission unit, a trunnion-bearing, a chain-case pivotally supported at said trunnion-bearing, a chain in the chain-case, a power-delivering shaft and sprocket for said chain in the trunnion end of the chain-case, a power-receiving shaft and sprocket for the chain in the remote end of the chain-case, a sprocket on the outer part of the latter shaft to receive a driving chain, removable and interchangeable bearing plates in the opposite sides of the chain-case at the power-receiving end, enabling the power-receiving shaft to be reversed end for end, the trunnion end of the chain-case being likewise reversible in the trunnion-bearing, and an adjusting screw device cooperative with the chain-case.

9. In a drive, a chain-case having trunnions at one end, a power-delivering shaft and sprocket in said end of the case, a power-receiving shaft and sprocket in the remote end of the case, a chain in the case passing over said sprockets an external power-receiving sprocket on the power-receiving shaft, an adjustment screw device supporting this end of the chain-case at variable height, a trunnion-bearing for the trunnion end of the chain-case having a bevel-gear case extension, and bevel gearing and a lateral shaft in said extension to be driven by the power-delivering shaft.

10. In a transmission unit, a support, a trunnion-bearing thereon, a chain-case pivotally supported at said trunnion-bearing, a chain in the chain-case, a power-delivering shaft and sprocket for said chain in the trunnion end of the chain-case, a power-receiving shaft and sprocket for the chain in the remote end of the chain-case, a sprocket on the outer part of the latter shaft to receive a driving chain, an adjusting-screw bearing on the support, an adjusting-screw connecting said remote end of the chain-case with said adjusting-screw bearing, said trunnion-bearing and adjusting-screw bearing being reversible on the support in respect to their right- and left-hand relation to each other, and the chain-case being adapted to be swung in the trunnion-bearing to reverse it end for end.

11. In a transmission unit, a trunnion-bearing, a chain-case pivotally supported at said trunnion-bearing, a chain in the chain-case, a power-delivering shaft and sprocket for said chain in the trunnion end of the chain-case, a power-receiving shaft and sprocket for the chain in the remote end of the chain-case, and a sprocket on the outer part of the latter shaft to receive a driving chain, said power-receiving shaft being reversible end for end in the chain-case, and the trunnion end of the chain-case being likewise reversible in the trunnion-bearing.

12. In a transmission unit, a trunnion-bearing, a chain-case pivotally supported at said trunnion-bearing so that it can be swung thereon to reverse the chain-case end for end, a chain in the chain-case, a power-delivering shaft and sprocket for said chain in the trunnion end of the chain-case, a power-receiving shaft and sprocket for the chain in the remote end of the chain-case, and a sprocket on the outer part of the latter shaft to receive a driving chain.

13. In a transmission unit, a trunnion-bearing, a chain-case pivotally supported at said trunnion-bearing so that it can be swung thereon to reverse the chain-case end for end, a chain in the chain-case, a power-delivering shaft and sprocket for said chain in the trunnion end of the chain-case, a power-receiving shaft and sprocket for the chain in the remote end of the chain-case, a sprocket on the outer part of the latter shaft to receive a driving chain, and means permitting reversal end for end of said power-receiving shaft in the chain-case.

14. In a transmission unit, a trunnion-bearing, a chain-case pivotally supported at said trunnion-bearing so that it can be swung on the trunnion-bearing to reverse the chain-case end for end, a chain in the chain-case, a power-delivering shaft and sprocket for said chain in the trunnion end of the chain-case, a power-receiving shaft and sprocket for the chain in the remote end of the chain-case, a sprocket on the outer part of the latter shaft to receive a driving chain, and means permitting reversal end for end of said power-receiving shaft in the chain-case, the chain-case being likewise reversible about its longitudinal axis with respect to its trunnion-bearing.

15. In a transmission unit, a trunnion-bearing, a chain-case pivotally supported at said trunnion-bearing so that it can be swung on the trunnion-bearing to reverse the chain-case end for end, a chain in the chain-case, a power-delivering shaft and sprocket for said chain in the trunnion end of the chain-case, a power-receiving shaft and sprocket for the chain in the remote end of the chain-case, a sprocket on the outer part of the latter shaft to receive a driving chain, and means permitting reversal of the chain-case about its longitudinal axis with respect to the trunnion-bearing.

16. In a transmission unit, a trunnion-bearing, a chain-case pivotally supported at said trunnion-bearing, a chain in the chain-case, a power-delivering shaft and sprocket for said chain in the trunnion end of the chain-case, a power-receiving shaft and sprocket for the chain in the remote end of the chain-case, a sprocket on the outer part of the latter shaft to receive a driving chain, and means permitting reversal end for end of said power-receiving shaft in the chain-case.

PAUL S. SHIELD.